(12) United States Patent
Frank et al.

(10) Patent No.: US 12,341,740 B2
(45) Date of Patent: Jun. 24, 2025

(54) CENTRAL NOTIFICATION MANAGEMENT

(71) Applicant: Google LLC, Mountain View, CA (US)

(72) Inventors: Stefan Frank, Belmont, MA (US);
Julia Claire Reynolds, Waltham, MA (US); Sung Hyun Cho, Lewisville, TX (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/550,660

(22) PCT Filed: Mar. 15, 2022

(86) PCT No.: PCT/US2022/071172
§ 371 (c)(1),
(2) Date: Sep. 14, 2023

(87) PCT Pub. No.: WO2022/198211
PCT Pub. Date: Sep. 22, 2022

(65) Prior Publication Data
US 2024/0275751 A1   Aug. 15, 2024

Related U.S. Application Data

(60) Provisional application No. 63/161,917, filed on Mar. 16, 2021.

(51) Int. Cl.
G06F 15/173 (2006.01)
H04L 51/214 (2022.01)

(52) U.S. Cl.
CPC .................................. *H04L 51/214* (2022.05)

(58) Field of Classification Search
CPC ..................................................... H04L 51/214
See application file for complete search history.

(56) References Cited

U.S. PATENT DOCUMENTS

| | | | |
|---|---|---|---|
| 9,913,246 B1* | 3/2018 | Carey | ................... H04W 4/026 |
| 2010/0215170 A1 | 8/2010 | Kannappan | |
| 2013/0316744 A1 | 11/2013 | Newham et al. | |
| 2014/0195620 A1 | 7/2014 | Srinivasan et al. | |
| 2014/0273975 A1 | 9/2014 | Barat et al. | |
| 2015/0230022 A1 | 8/2015 | Sakai et al. | |
| 2015/0350129 A1 | 12/2015 | Cary et al. | |
| 2019/0158615 A1 | 5/2019 | DeLuca et al. | |
| 2019/0166245 A1 | 5/2019 | Agrawal et al. | |
| 2021/0028955 A1 | 1/2021 | Conde et al. | |

OTHER PUBLICATIONS

International Search Report and Written Opinion of International Application No. PCT/US2022/071172, dated Jun. 24, 2022, 11 pp.

* cited by examiner

*Primary Examiner* — Joseph R Maniwang
(74) *Attorney, Agent, or Firm* — Shumaker & Sieffert, P.A.

(57) ABSTRACT

A computing device is described that receives a notification generated by a notification source. The computing device selects, based at least in part on one or more notification routing rules, one or more computing devices that are to output one or more indications of the notification out of a plurality of computing devices communicably coupled to the computing device. The computing device routes the notification to the one or more computing devices for outputting the one or more indications of the notification by each of the one or more computing devices.

19 Claims, 4 Drawing Sheets

CENTRAL NOTIFICATION MANAGEMENT

RELATED APPLICATIONS

This application claims the benefit of U.S. Provisional Patent Application No. 63/161,917 filed Mar. 16, 2021, the entire contents of which are hereby incorporated by reference.

BACKGROUND

Applications or services may generate "notifications" for alerting a user to new or interesting information for a variety of reasons. For example, an application or service may generate notifications to alert the user to a new text message, a reminder, a sports score, a news headline, and the like. A user may use multiple different computing devices at the same time that are each able to output indications of notifications. For example, a user may use a smartphone, a smart watch, and computerized headphones that each be able to output indications of notifications.

SUMMARY

In general, the techniques of this disclosure are directed to managing the outputting of indications of notifications on different computing devices that are associated with and/or used by a user. A computing device associated with a user may receive a notification generated by an application executing at, or a service accessible to, the computing device. When the computing device receives a notification, the computing device may, based at least in part on one or more notification routing rules, select one or more computing devices used by the user that are to output an indication of the notification. The one or more selected computing devices may therefore each output an indication of the notification. By selecting one or more computing devices used by the user that are to output an indication of the notification, the computing device may, in some instances, enable certain computing devices used by the user to refrain from outputting indications of the notification, thereby potentially preventing a user that uses multiple computing devices from being overwhelmed by each of the user's computing devices outputting an indication of the notification.

In some aspects, the techniques described herein relate to a method including: receiving, by one or more processors of a computing device, a notification generated by a notification source; selecting, by the one or more processors and based at least in part on one or more notification routing rules, one or more computing devices that are to output one or more indications of the notification out of a plurality of computing devices communicably coupled to the computing device; and routing, by the one or more processors, the notification to the one or more computing devices for outputting the one or more indications of the notification by the one or more computing devices.

In some aspects, the techniques described herein relate to a computing device including: a memory; and one or more processors configured to: receive a notification generated by a notification source; select, based at least in part on one or more notification routing rules, one or more computing devices that are to output one or more indications of the notification out of a plurality of computing devices communicably coupled to the computing device; and route the notification to the one or more computing devices for outputting the one or more indications of the notification by each of the one or more computing devices.

In some aspects, the techniques described herein relate to a non-transitory computer-readable storage medium including instructions, that when executed by one or more processors, cause the one or more processors of a computing device to: receive a notification generated by a notification source; select, based at least in part on one or more notification routing rules, one or more computing devices that are to output one or more indications of the notification out of a plurality of computing devices communicably coupled to the computing device; and route the notification to the one or more computing devices for outputting the one or more indications of the notification by each of the one or more computing devices.

The details of one or more examples are set forth in the accompanying drawings and the description below. Other features, objects, and advantages of the disclosure will be apparent from the description and drawings, and from the claims.

DETAILED DESCRIPTION

Figure 1A:
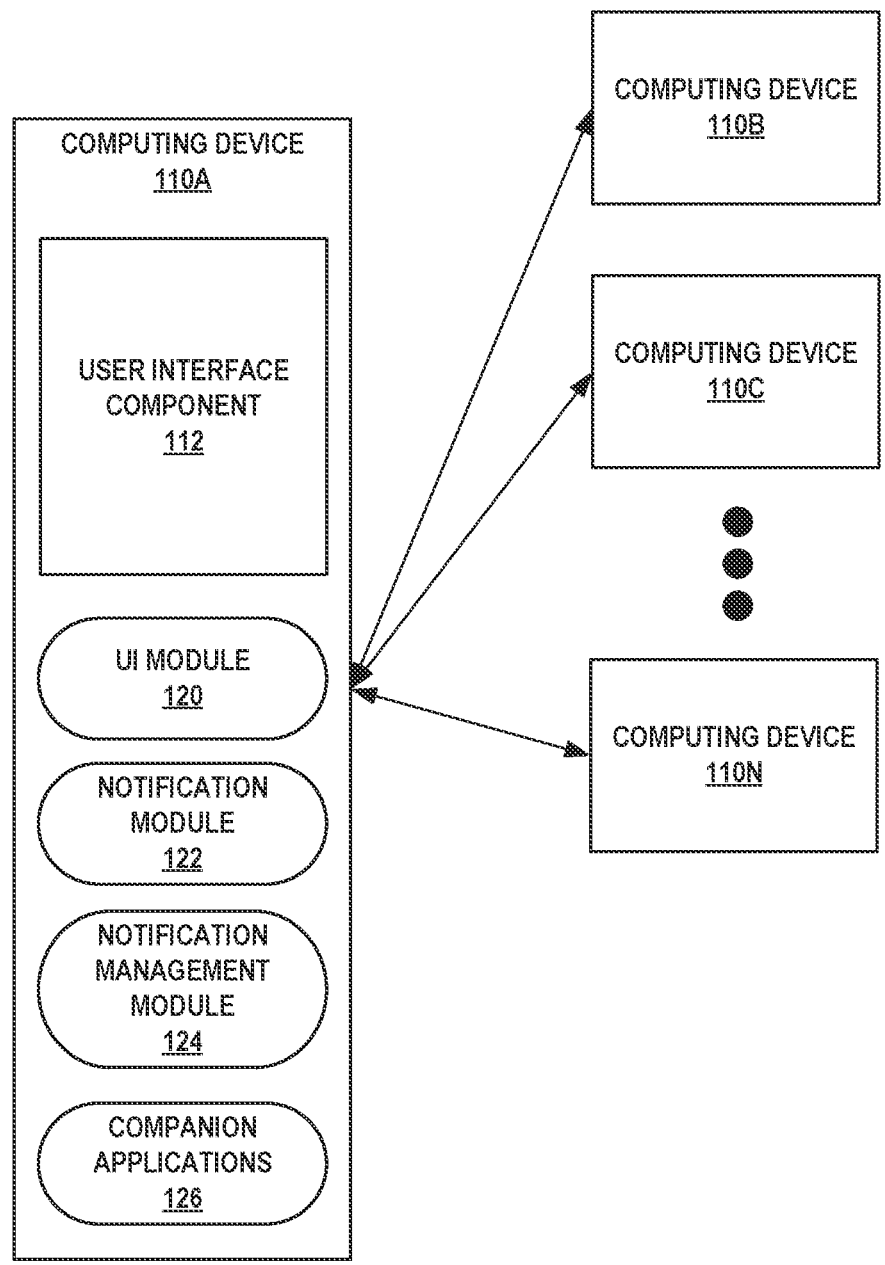
FIGS. 1A and 1B are conceptual diagrams illustrating example computing systems configured to perform management of notifications, in accordance with one or more aspects of the present disclosure.

In general, the techniques of this disclosure are directed to managing the outputting of indications of notifications on different computing devices that are associated with and/or used by a user. A computing device associated with a user may receive notification data (referred to herein simply as a "notification") generated by an application executing at, or a service accessible to, the computing device (otherwise referred to herein as "a notification source"). When the computing device receives a notification, the computing device may process the notification and output an indication of the notification, such as by outputting an indication of the notification for display at a display device, outputting an audible alert, outputting haptic feedback, and the like. If a user is using multiple computing devices at the same time, such as any combination of a smartphone, a smart watch, a laptop computer, computerized headphones, a smart home assistant device, and the like, each of the computing devices being used may be able to output an indication of a notification received by, e.g., the smartphone.

However, having multiple computing devices being used by a user each output an audible alert and/or haptic feedback each time one of the computing devices receives a notification may increase user burden on the user and may decrease the user experience of the computing devices. As such, aspects of this disclosure describe techniques for managing notifications received by computing devices to, upon a computing device receiving a notification, select one or more computing devices that are to output an indication of the notification out of the multiple computing devices being used by the user, thereby potentially prevent a user of multiple computing devices from being overwhelmed by each of the computing devices outputting an indication of the notification. The techniques of this disclosure thereby improves the usability of computing devices and may enable computing devices to provide a less frustrating and more enjoyable user experience to the user.

Furthermore, by selecting one or more computing devices that are to output an indication of a notification out of a plurality of computing devices, the techniques of this disclosure may enable the plurality of computing devices to refrain from output indications of every notification received by a computing device. Refraining from outputting indications of every notification received by a computing device may reduce the number of times the plurality of computing devices may have to turn their displays on to display indications of notifications, output audible alerts indicative of notifications, and/or output haptic feedback indicative of notifications. Reducing the number of times the plurality of computing devices turn on their displays, output audible alerts, and/or output haptic feedback may reduce the battery usage of the plurality of computing devices and may increase the battery life of the plurality of computing devices.

Figure 1B:
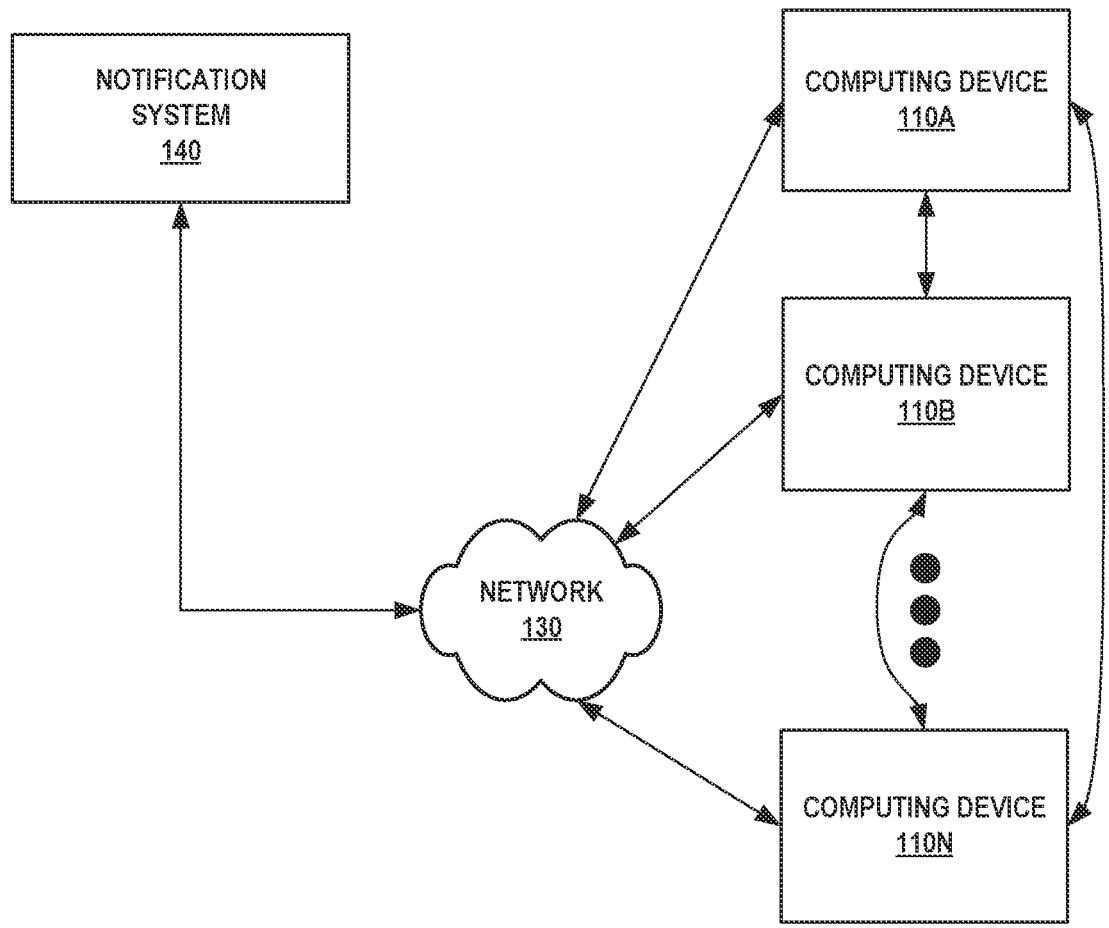

FIGS. 1A and 1B are conceptual diagrams illustrating example computing systems configured to perform management of notifications, in accordance with one or more aspects of the present disclosure. In the example of FIG. 1A, computing devices 110A-110N each represents an individual mobile or non-mobile computing device. Examples of each of computing devices 110A-110N include a mobile phone, a tablet computer, a laptop computer, a desktop computer, a server, a mainframe, a set-top box, a television, a wearable device (e.g., a computerized watch, computerized eyewear, computerized headphones, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to receive, and output an indication (e.g., audible alert, visual alert, haptic alert, voice alert, or other type of indication) of, notification data.

Computing device 110A may be communicably coupled to computing devices 110B-110N via BLUETOOTH, WIFI, BLUETOOTH Low Energy (BLE), ultra-wideband (UWB), or any other suitable wireless communications technique. In some examples, computing device 110A may be a smartphone and computing devices 110B-110N may be computing devices such as a smart watch, a smart home assistant device, a computerized headphone, a laptop computer, and the like. In some examples, one or more of computing devices 110B-110N may be actively connected to computing device 110A only when the one or more computing devices are being used by a user. For example, a computerized headphone may be actively connected to computing device 110A only when the computerized headphone is turned on and being worn by a user. In another example, a computerized watch may be wirelessly connected to computing device 110A only when the computerized watch is turned on, being worn by a user, and is unlocked.

In some examples, computing devices 110B-110N communicably coupled to computing device 110A may have associated companion applications 126 that execute at computing device 110A. Such companion applications 126 may enable computing device 110A to establish communications with computing devices 110B-110N and may also provide graphical user interfaces (GUIs) that enable the user of computing device 110A to change the settings and/or operations of computing devices 110B-110N. In some examples, companion applications 126 may be integrated into or otherwise be a part of the operating system of computing device 110A.

In some examples, computing device 110A may also communicate with notification system 140 via network 130. Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between notification system 140 and computing device 110A. Computing device 110A and notification system 140 may transmit and receive data across network 130 using any suitable communication techniques. Computing device 110A and notification system 140 may each be operatively coupled to network 130 using respective network links. The links coupling computing device 110A and notification system 140 to network 130 may be Ethernet or other types of network connections and such connections may be wireless and/or wired connections.

Notification system 140 may represent any suitable remote computing system, such as one or more desktop computers, laptop computers, mainframes, servers, cloud computing systems, etc. capable of sending and receiving information both to and from a network, such as network 130. Notification system 140 hosts (or at least provides access to) a notification service, such as a push notification service for sending notification data to computing device 110A. In some examples, notification system 140 may represent cloud computing systems that provide access to their respective services via a cloud.

Computing device 110A includes user interface component ("UIC") 112, user interface ("UI") module 120, notification module 122, notification management module 124, and companion applications 126. Notification module 122, notification management module 124, and companion applications 126 may perform operations described herein using software, hardware, firmware, or a mixture of hardware, software, and firmware residing in and/or executing at computing device 110A. Computing device 110A may execute notification module 122, notification management module 124, and companion applications 126 with multiple processors or multiple devices, as virtual machines executing on underlying hardware, as one or more services of an operating system or computing platform, and/or as one or more executable programs at an application layer of a computing platform of computing device 110A.

UIC 112 of computing device 110A may function as an input and/or output device for computing device 110A. UIC 112 may be implemented using various technologies. For instance, UIC 112 may function as an input device using presence-sensitive input screens, microphone technologies, infrared sensor technologies, or other input device technology for use in receiving user input. UIC 112 may function as an output device configured to present output to a user using any one or more display devices, speaker technologies, haptic feedback technologies, or other output device technology for use in outputting information to a user.

UIC 112 may detect input (e.g., touch and non-touch input) from a user of computing device 110A. UIC 112 may detect indications of input by detecting one or more gestures performed by a user (e.g., the user touching, pointing, and/or swiping at or near one or more locations of UIC 112 with a finger or a stylus pen). UIC 112 may output information to a user in the form of a user interface, which may be associated with functionality provided by computing device 110A.

Notification module 122 may perform functions associated with receiving, managing, and otherwise handling at least a portion of the notification data generated and/or received by platforms, applications, and services executing at, or in communication with, computing device 110A. Such notification data may be generated by applications and services executing at computing device 110A or received by computing device 110A from an external system, such as notification system 140. As used throughout the disclosure, the terms "notification" and "notification data" are used to describe various types of information that may indicate the occurrence of an event within an execution environment (e.g., that includes platforms, applications, and services executing at, or in communication with, computing device 110A) computing device 110A. A notification may include, but is not limited to, information specifying an event such as the receipt of a communication message (e.g., e-mail, instant message, text message, direct message, private message, etc.) by a messaging account associated with computing device 110A, the receipt of information by a social networking account associated with computing device 110A (e.g., a private message, a reply to a social media post, a reaction to a social media post, etc.), a reminder of a calendar event (meetings, appointments, etc.) associated with a calendar account of computer device 110A, information generated and/or received by a third-party application executing at or in communication with computing device 110A such as meal delivery updates, sports scores, news headlines, etc., the end of a timer, an alarm, the transmittal and/or receipt of inter-component communications between two or more components of platforms, applications, and/or services executing at computing device 110A, or any other information that may be of interest to a user of computing device 110A.

Notification module 122 may process notifications generated by an application executing at, or a service accessible to, computing device 110 (otherwise referred to herein as "a notification source", such as notification system 140). As computing device 110A receives the notifications from any device, server, or service, executing at or in communication with computing device 110A, notification module 122 may distribute portions of the notifications to other modules, applications, and/or services executing at or in communication with computing device 110A.

In cases where notification module 122 or any other part of computing device 110A stores or makes use of personal information associated with the user of computing device 110A, notification module 122 or any other part of computing device 110A may only store or make use of the personal information after receiving explicit consent from the user to do so (e.g., by a menu setting, or obtaining consent in other form). Computing device 110A may encrypt or otherwise treat any personal information being analyzed and/or stored to remove the actual identity of the user before storing or making use of the personal. For example, the information may be treated by notification module 122 so that any personally-identifiable information is removed when received from a notification source and stored for later processing.

Notification management module 124 may handle the routing of notifications from computing device 110A to computing devices 110B-110N that are communicably coupled to computing device 110A. Handling the routing of notifications from computing device 110A to computing devices 110B-110N includes selecting one or more computing devices out of computing devices 110A-110N that are to output indications of a notification, and determining the types of indications of a notification that the one or more computing devices are to output.

While FIG. 1A illustrates notification management module 124 as being separate from notification module 122 and companion applications 126, notification management module 124 may, in some examples, be integrated with notification module 122 and/or companion applications 126. That is, in some examples, notification module 122 and/or companion applications 126 may implement some or all of the functionalities of notification management module 124 described herein, and may perform some or all of the functionalities of notification management module 124 described herein.

Notification management module 124 may in response to notification module 122 receiving a notification generated by a notification source, such as a notification received from notification system 140 or a notification generated by an application or service executing at computing device 110A, route the notification from computing device 110A to one or more of computing devices 110B-110N. In some examples, notification management module 124 may route a notification immediately upon the notification being received or generated by computing device 110A. In other examples, notification management module 124 may not route a notification immediately upon the notification being received or generated by computing device 110A. Instead, notification management module 124 may, upon computing device 110A receiving or generating a notification, wait for a period of time before routing the notification. For example, when computing device 110A receives or generates a notification while in a do not disturb mode or a focus mode, notification management module 124 may wait until computing device 110A is no longer in the do not disturb mode or focus mode before routing the notification.

Notification management module 124 may, in response to notification module 122 receiving a notification generated by a notification source, route the notification to one or more computing devices that are each to output an indication of the notification out of computing devices 110A-110N. That is, by routing the notification to one or more of computing devices 110A-110N, notification management module 124 selects the one or more computing devices that are each to output an indication of the notification out of computing devices 110A-110N.

Notification management module 124 may route notifications to computing devices 110B-110N based on one or more notification routing rules. Each of the one or more notification routing rules may specify, based on contextual information, whether a notification should be routed to one or more of computing devices 110B-110N. Such contextual information may include contextual information associated with the notification to be routed, contextual information associated with computing devices 110A-110N, contextual information regarding the environment surrounding computing devices 110A-110N, contextual information regarding the user of computing devices 110A-110N, or any other suitable contextual information. Notification management module 124 may therefore, in response to notification module 122 receiving a notification, apply one or more notification routing rules to the notification based at least in part on such contextual information to determine the one or more of computing devices 110B-110N that are to each output an indication of the notification.

Each notification may be of a notification type, and one or more notification rules may specify, for each of computing devices 110B-110N, which notification types can be routed to a computing device and/or which notification types cannot be routed to a computing device. As such, notification management module 124 may route a notification based on the notification type of the notification. Examples of notification types include a conversation notification type, an alerting notification type, a silent notification type, or an on-going notification type.

A notification is of a conversation notification type if the notification is a notification regarding real-time conversations (e.g., with people, chatbots, etc.), such as text messages, chat messages, phone calls, and the like. A notification may be of an alerting notification type if the notification is a time-sensitive notification that may require the immediate attention of the user of computing device 110A, such as a notification of an alarm being triggered, a notification that a calendar event has begun, a notification that a meal has been delivered, and the like. When notification module 122 receives a notification of an alerting notification type, notification module 122 may cause computing device 110A to output an audible alert and/or haptic feedback (e.g., output a vibratory alert) to indicate to the user that notification module 122 has received an alerting notification.

A notification of a silent notification type may, when received by notification module 122, not cause computing device 110A to output an audible alert and/or haptic feedback (e.g., output a vibratory alert) to indicate to the user that notification module 122 has received the notification. A notification of an on-going notification type may be notifications that cannot be dismissed by the user of computing device 110A (e.g., by providing user input at UIC 112), and thus can instead be dismissed by an application or service at computing device 110A. A notification of an on-going notification type may be used to indicate a background task that the user of computing device 110A is actively engaged with (e.g., playing music or working out) or is pending in some way (e.g., a file download, a sync operation, an active network connection, etc.).

In some examples, a notification routing rule may specify the types of notifications that are to be or are not to be routed to a computing device or a type of computing device. For example, one or more notification routing rules may specify that notifications of the conversation notification type are to be routed to computerized headphones and smart watches, but are not to be routed to smart home assistant devices. As described above, examples of types of computing devices may include a mobile phone, a tablet computer, a laptop computer, a computerized watch, computerized eyewear, computerized headphones, computerized gloves, an intelligent thermostat, a home assistant device, and the like. Notification management module 124 may, in response to notification module 122 receiving a notification generated by a notification source, determine the notification type of the notification and may determine, based on one or more routing rules, one or more computing types to which the notification of the determined notification type can be routed. Notification management module 124 may determine one or more of computing devices 110B-110N that are of the determined one or more computing types and may route the notification to the determined one or more of computing devices 110B-110N.

Each of computing devices 110B-110N may therefore be associated with one or more notification routing rules for its computing device type that specifies one or more notification types to be routed to the computing device and/or one or more notification types that are not to be routed to the computing device. For example, if computing device 110B is a smart watch, computing device 110B may be associated with one or more routing rules for a smart watch which may specify that notifications associated with the conversation notification type and the alerting notification type are to be routed to computing device 110B, and that notifications associated with other notification type, such as the silent notification type and the on-going notification type are not to be routed to computing device 110B.

In another example, if computing device 110C is a computerized headphone, computing device 110C may be associated with one or more routing rules for a computerized headphone which specify that notifications associated with the conversation notification type are to be routed to computing device 110C, and that notifications associated with other notification types, such as the alerting notification type, the silent notification type, and the on-going notification type are not to be routed to computing device 110C.

In some examples, the one or more notification routing rules may specify whether notifications of certain notification types are to be silenced and/or suppressed at computing device 110A when such notifications are routed to one or more of computing devices 110B-110N. A notification may be silenced at computing device 110A if computing device 110A outputs an indication of the notification for display but refrains from outputting an audible alert and/or haptic feedback indicative of the notification. A notification may be suppressed at computing device 110A if computing device 110A refrains from outputting any indication of the notification.

In some examples, the one or more notification routing rules may include one or more conditional notification routing rules, and notification management module 124 may route notifications based at least in part on the one or more conditional notification routing rules. A conditional notification routing rule may specify to which computing device a notification is routed, such as to which of computing devices 110B-110N computing device 110A is to route a notification, based on one or more conditions. The one or more conditions of a conditional notification routing rule may be based on determining the status of computing devices 110A-110N, the physical proximity between two or more of computing devices 110A-110N, or any other suitable pieces of contextual information.

For example, a conditional notification routing rule associated with a smart watch may specify a condition that if the user of computing device 110A is wearing the smart watch (e.g., computing device 110B is a smart watch being worn by the user and is in an unlocked state), to route notifications of the alerting notification type to the smart watch (e.g., computing device 110B) and to prevent computing device 110A from outputting an audible alert and/or haptic feedback (e.g., output a vibratory alert) to indicate to the user that notification module 122 has received the notification.

In this example, notification management module 124 may, in response to notification module 122 receiving a notification of an alerting notification type, follow the example conditional routing rule by determining whether computing device 110B is being worn by the user and is in an unlocked state. If notification management module 124 determines that computing device 110B is being worn by the user and is in an unlocked state, notification management module 124 may route the notification to computing device 110B and may also cause computing device 110A to refrain from outputting an audible alert and/or haptic feedback to indicate receipt of the notification.

In another example, a conditional notification routing rule associated with a smart home assistant device may specify a condition that if the user of a smartphone (e.g., computing device 110A) is physically closer to a smart home assistant device than to the user's smartphone, then notifications of notification types supported by the smart home assistant device are to be routed to the smart home assistant device (e.g., computing device 110C). In this example, notification management module 124 may, in response to notification module 122 receiving a notification of a notification type supported by a smart home assistant device, such as computing device 110C, follow the example conditional routing rule by determining whether the user of computing device 110A is physically closer to computing device 110C than they are to computing device 110A. If the user is wearing a smart watch (e.g., computing device 110B), notification management module 124 may determine whether the user of computing device 110A is physically closer to computing device 110C than they are to computing device 110A by determining whether computing device 110B is physically closer to computing device 110A or to computing device 110C using any suitable proximity detection or distance determination techniques. If notification management module 124 determines that the user is closer to computing device 110C than the user is to computing device 110A, notification management module 124 may route the notification to computing device 110C.

In some examples, the one or more notification routing rules may include one or more cross-device notification routing rules. Cross-device notification routing rules may specify, when a user uses different types of devices at the same time, the manner in which the different computing devices being used by the user may output notifications in conjunction with each other in order to take advantage of the different capabilities of the different types of devices. That is, the one or more cross-device notification routing rules may enable the same notification to be presented in different ways on different computing devices. In one example, the one or more cross-device notification routing rules may enable the same notification to be presented in different ways on different computing devices based on the context, such as the device capabilities of the computing devices being used by the user of computing device 110A.

For example, a cross-device notification routing rule may specify that if computing device 110A is communicably coupled to both a computerized headphone (e.g., computing device 110B) and a smart watch (e.g., computing device 110C) that are both being worn by the user of computing device 110A, when notification module 122 receives a notification of a conversation notification type, such as a text message, computing device 110A may route the notification of the conversation notification type to both the computerized headphone and the smart watch.

Further, the cross-device notification routing rule may specify how the computerized headphone and/or the smart watch are to present indications of the notification, such as by causing the computerized headphone and/or the smart watch to present indications of the notification in a specified manner or by changing the manner in which the computerized headphone and/or the smart watch to present indications of the notification. In this example, having the headphone provide computerized speech reading an audio transcription of the text message may provide a suboptimal user experience. Thus, if the user is wearing a computerized headphone and wearing a smart watch, the headphone and the smart watch may, in conjunction, provide a better user experience by having the smart watch output the text message at the display device of the smart watch.

As such, in this example, the cross-device notification routing rule may specify that the computerized headphone may refrain from outputting an audio transcription of the contents of the notification. Instead, the cross-device notification routing rule may specify that the computerized headphone may output an audible alert to provide an audible indication that notification module 122 has received the notification, and may specify that the smart watch may output for display the contents of the notification. Further, the cross-device notification routing rule may silence computing device 110A to prevent computing device 110A from outputting an audible alert or haptic feedback in connection with receiving the notification. In this way, a cross-device notification routing rule may decompose the presentation of notifications into surface-specific experiences.

Thus, when notification module 122 receives a notification of a conversation type, computing device 110A may determine whether the user of computing device 110A is wearing both headphones and a smart watch, such as by determining whether computing device 110A is communicably coupled to a computerized headphone and a smart watch that are both being worn by the user of computing device 110A. If computing device 110A determines that the user of computing device 110A is wearing both headphones and a smart watch, computing device 110A may route the notification of the conversation notification type to both the computerized headphone and the smart watch, including sending an indication to computerized headphone to refrain from outputting an audio transcription of the contents of the notification. The computerized headphone may, in response, output an audible alert to provide an audible indication that notification module 122 has received the notification.

Notification management module 124 may, in response to notification module 122 receiving a notification, apply the one or more notification routing rules to select one or more computing devices to which the notification is routed out of the plurality of computing devices (e.g., computing devices 110B-110N) communicably coupled to computing device 110A. Notification management module 124 may route a notification to a selected computing device by causing the selected computing device to output an indication of the notification in a manner determined by notification management module 124. For example, notification management module 124 may route a notification to a selected computing device by sending, to the selected computing device, a request to output an indication of the notification and by sending an indication of the manner in which the selected computing device is to output the indication of the notification, such as an indication of whether the selected computing device is to audibly output an audible alert, whether the selected computing device is to output haptic feedback, whether the selected computing device is to output an indication of the notification for display at a display device of the selected computing device, and the like.

If companion applications 126 associated with computing devices 110B-110N are installed at computing device 110A, notification management module 124 may communicate with companion applications 126 to route a notification to one or more of computing devices 110B-110N communicably coupled to computing device 110A. In some examples, companion applications 126 associated with computing devices 110B-110N may receive indications of each notification received by notification module 122, and each of companion applications 126 may, for each notification received by notification module 122, communicate with notification management module 124 to determine, based on applying the one or more notification routing rules, whether an associated computing device is to output an indication of the notification.

In some examples, companion applications 126 associated with computing devices 110B-110N may not receive indications of each notification received by notification module 122. Instead, notification management module 124 may communicate with companion applications 126 to route notifications to one or more of computing devices 110B-110N. For example, if notification management module 124 determines to route a notification to computing device 110B but not to computing devices 110C-110N, notification management module 124 may send, to the companion application associated with computing device 110B out of companion applications 126, a request to output an indication of the notification and an indication of the manner in which the selected computing device is to output the indication of the notification. The companion application associated with computing device 110B may therefore communicate with computing device 110B to cause computing device 110B to output the indication of the notification in the indicated manner.

In some examples, notification module 122 and/or notification management module 124 may also provide an application programming interface (API) that companion applications 126 may use to listen for notifications received by notification module 122. Using the API to listen for notifications received by notification module 122 may enable companion applications 126 to implement and perform any of the functionalities of notification management module 124 described throughout this disclosure. For example, because each of companion applications 126 is associated with one or more of computing devices 110B-110N, a companion application of companion applications 126 may use the notification listener API to listen for notifications of the one or more notification types supported by the one or more of computing devices 110B-110N associated with the companion application. The companion application may, in response to determining that notification module 122 has received a notification of a notification type supported by the one or more of computing devices 110B-110N associated with the companion application, route the notification to the one or more of computing devices 110B-110N associated with the companion application.

Similarly, companion applications 126 may also use the API to implement conditional routing rules and cross-device routing rules. Companion applications 126 may exchange information, such as contextual information and/or state information associated with computing devices 110B-110N with each other. Examples of state information associated with computing devices 110B-110N may include information regarding whether computing devices 110B-110N are being actively used by the user, whether computing devices 110B-110N are wirelessly connected to computing device 110A, whether wearable devices of computing devices 110B-110N are being worn by the user and are unlocked, the proximity (e.g., physical distance) of computing devices 110B-110N to the user, and the like. Companion applications 126 may use such state information associated with computing devices 110B-110N to route notifications to computing devices 110B-110N in accordance with conditional routing rules.

In some examples, notification module 122 and/or notification management module 124 may provide a user interface, such as a GUI, that is outputted at UIC 112 with which a user of computing device 110A may interact to select, specify, and/or customize the notification routing rules that govern the routing of notifications to computing devices 110B-110N. Such a user interface may provide a centralized view of the notification routing rules so that a user of computing device 110A is able to see the notification routing rules that are in effect and how such notification routing rules affect the routing of notifications for each of computing devices 110B-110N. The user interface may also enable the user to be able to customize and/or adjust the notification routing rules and how each of computing devices 110B-110N. For example, the user interface may provide one or more controls or other user interface elements that enable the user to turn off notifications for one or more of computing devices 110B-110N, thereby causing the one or more of computing devices 110B-110N to refrain from outputting indications of notifications.

In some examples, notification module 122 and/or notification management module 124 may provide an API that can be accessed and/or invoked by applications at computing device 110A to select, specify, and/or customize the notification routing rules that govern the routing of notifications to computing devices 110B-110N. Companion applications 126 may use the API to create and/or modify one or more notification routing rules associated with computing devices 110B-110N. That is, a companion application associated with computing device 110B may use the API to create and/or modify one or more notification routing rules associated with computing device 110B, a companion application associated with computing device 110C may use the API provided by notification management module 124 to create and/or modify one or more notification routing rules associated with computing device 110C, and the like. For example, a companion application associated with computing device 110B may use the API to specify one or more routing rules regarding the notification types that can be routed to computing device 110B, one or more routing rules regarding whether to silence computing device 110A when a notification is routed to computing device 110B, the manner in which computing device 110B outputs indications of notifications of certain notification types, etc.

In some examples, companion applications 126 may use the API provide by notification module 122 and/or notification management module 124 to generate and output user interfaces (e.g., for display at UIC 112) with which the user of computing device 110A can interact to create and/or modify notification routing rules associated with computing devices 110B-110N. Specifically, a companion application associated with a computing device (e.g., computing device 110B) may output a user interface that provides a view of the notification settings and/or notification routing rules for the associated computing device.

The user interface may enable a user to customize and/or adjust the notification routing rules and/or the notification settings for the associated computing device. For example, the user interface may provide one or more controls or other user interface elements that enable the user to turn notifications on and off to control whether notifications are routed to the associated computing device, specify the notification types to be routed to the associated computing device, specify the application executing at the associated computing device that is to output the indications of notifications routed to the associated computing device, specify whether the associated computing device suppresses and/or silences other computing devices (e.g., computing device 110A) to prevent other computing devices from outputting indications of notifications that are also routed to the associated computing devices, and the like.

In some examples, in addition or alternatively, notification module 122 and/or notification management module 124 may also provide a user interface, such as a GUI, that is outputted (e.g., for display at UIC 112) with which a user of computing device 110A may interact to select, specify, and/or customize the notification routing rules that govern the routing of notifications to computing devices 110B-110N. Such a user interface may provide a centralized view of the notification routing rules so that a user of computing device 110A is able to see the notification routing rules that are in effect and how such notification routing rules affect the routing of notifications for each of computing devices 110B-110N. The user interface may also enable the user to customize and/or adjust the notification routing rules and/or notification settings of each of computing devices 110B-110N. For example, the user interface may provide one or more controls or other user interface elements that enable the user to turn notifications on and off to control whether notifications are routed to one or more of computing devices 110B-110N, specify the notification types to be routed to one or more of computing devices 110B-110N, specify the applications executing at one or more of computing devices 110B-110N that is to output the indications of notifications routed to one or more of computing devices 110B-110N, specify whether one or more of computing devices 110B-110N suppresses and/or silences other computing devices (e.g., computing device 110A) to prevent other computing devices from outputting indications of notifications that are also routed to one or more of computing devices 110B-110N, and the like.

In some examples, computing devices 110A-110N may include functionality for physically controlling whether notifications are routed to computing devices 110A-110N and/or whether computing devices 110A-110N outputs indications of notifications. For example, computing devices 110A-110N may include physical buttons or other hardware that users may use to turn on and turn off the ability of computing devices 110A-110N to output indications of notifications.

In some examples, instead of a single computing device (e.g., computing device 110A) that receives notifications and performs routing of the received notifications to other communicably coupled computing devices (e.g., computing devices 110B-110N), a plurality of computing devices being associated with the same user may each receive notifications from an external notification system, such as from the cloud. In these examples, instead of a single computing device that performs the routing of notifications to other communicably coupled devices, the plurality of computing devices may communicate with each other to apply one or more notification routing rules, as described above, to determine which one or more of the computing devices are to output indications of the received notification.

As shown in FIG. 1B, computing devices 110A-110N may be associated with the same user, and may each be connected to notification system 140 over network 130. Notification system 140 may generate notifications associated with the user (e.g., notifications associated with a user account of the user) of computing devices 110A-110N, and may send notifications associated with the user of computing devices 110A-110N to one or more of computing devices 110A-110N via network 130.

Computing devices 110A-110N may be communicably coupled to each other via BLUETOOTH, WIFI, BLE, UWB, or any other suitable wireless communications technology. Computing devices 110A-110N may, in response to receiving the notification from notification system 140, communicate with each other to orchestrate the outputting of the notification at computing devices 110A-110N, including determining which one or more of computing devices 110A-110N are to output the notification. Computing devices 110A-110N may continuously exchange information, such as state information, associated with computing devices 110A-110N with each other. As described above, examples of state information state information associated with computing devices 110A-110N may include information regarding whether computing devices 110A-110N are being actively used by the user, whether wearable devices of computing devices 110A-110N are being worn by the user and are unlocked, the proximity (e.g., physical distance) of computing devices 110A-110N to the user, and the like. Computing devices 110A-110N may use such information to determine which other computing devices are being used, the state of the other computing devices, the capabilities of the other computing devices, and the like.

Each computing device of computing devices 110A-110N is configured to receive notifications from notification system 140 and/or to generate notifications. Each computing device of computing devices 110A-110N may be configured to, in response to receiving a notification, from notification system 140 and/or generating a notification, determine whether to output an indication of the notification. In some examples, if a computing device determines to output an indication of the notification, the computing device may also determine the form in which to output the indication of the notification. For example, the computing device may determine whether to audibly output an indication of the notification, such as by outputting an alert or by outputting an audible transcription of the contents of the notification, whether to output haptic feedback indicative of the notification, whether to output an indication of the notification for display at a display, and the like.

Each computing device of computing devices 110A-110N may be associated with one or more routing rules, and each computing device is configured to determine whether to output an indication of a notification and/or determine the form in which to output the indication of the notification based on one or more notification routing rules. As described above, in some examples, each computing device may support outputting indications of notifications of one or more notification types, and each computing device may be associated with one or more notification routing rules that specify the one or more notification types supported by the computing device. Thus, in some examples, each of computing devices 110A-110N may determine, based on the one or more notification routing rules associated with the computing device, whether a notification is of a supported notification type and, in response to determining that the notification is of a supported notification type, output an indication of the notification.

In some examples, one or more of computing devices 110A-110N may determine whether to output an indication of a notification and/or determine the form in which to output the indication of the notification based on one or more conditional notification routing rules. For example, a smartphone may be associated with a conditional notification routing rule associated that specifies a condition that if the user of the smartphone (e.g., computing device 110A) is physically closer to a smart home assistant device (e.g., computing device 110C) than to the user's smartphone, then the smartphone may refrain from outputting an indication of the notification in lieu of the smart home assistant device outputting an indication of the notification.

In this example, computing device 110A may follow the example conditional routing rule by determining whether the user of computing device 110A is physically closer to computing device 110C than they are to computing device 110A. If the user is wearing a smart watch (e.g., computing device 110B), notification management module 124 may determine whether the user of computing device 110A is physically closer to computing device 110C than they are to computing device 110A by determining whether computing device 110B is physically closer to computing device 110A or to computing device 110C using any suitable proximity detection or distance determination techniques.

If computing device 110A determines that the user is closer to computing device 110C than the user is to computing device 110A, computing device 110A may refrain from outputting an indication of the notification in lieu of the smart home assistant device. Instead, computing device 110A may enable computing device 110C to output an indication of the notification, such as by sending a request to computing device 110C to output an indication of the notification.

In some examples, one or more of computing devices 110A-110N may, such as based on the information exchanged between computing devices 110A-110N, determine the types of computing devices of computing devices that it is communicably coupled to determine whether to output an indication of a notification and/or the type of indication of the notification to output (e.g., whether to output an audible alert, whether to output haptic feedback, etc.). For example, if computing device 110A is a computerized headphone, computing device 110A may, in response to receiving a notification of a conversation notification type, determine whether to audibly output a text-to-speech transcription of the contents of the notification based on the types of computing devices of computing devices 110B-110N that it is communicably coupled to computing device 110A. For example, if none of computing devices 110B-110N is a computing device that includes a display device (e.g., a smart watch or a smartphone), computing device 110A may audibly output a text-to-speech transcription of the contents of the notification. Conversely, if at least one of computing devices 110B-110N is a computing device that includes a display device, such as a smart watch, computing device 110A may audibly output an audible alert, such as a beep, instead of outputting a text-to-speech transcription of the contents of the notification.

Thus, computing device 110A may, in response to receiving a notification, communicate with computing devices 110B-110N to determine information regarding other information regarding computing devices 110B-110N, such as the type of each of computing devices 110B-110N. If computing device 110A, based on its communications with each of computing devices 110B-110N, determines that none of computing devices 110B-110N is a computing device that includes a display device, computing device 110A may audibly output a text-to-speech transcription of the contents of the notification.

Figure 2:
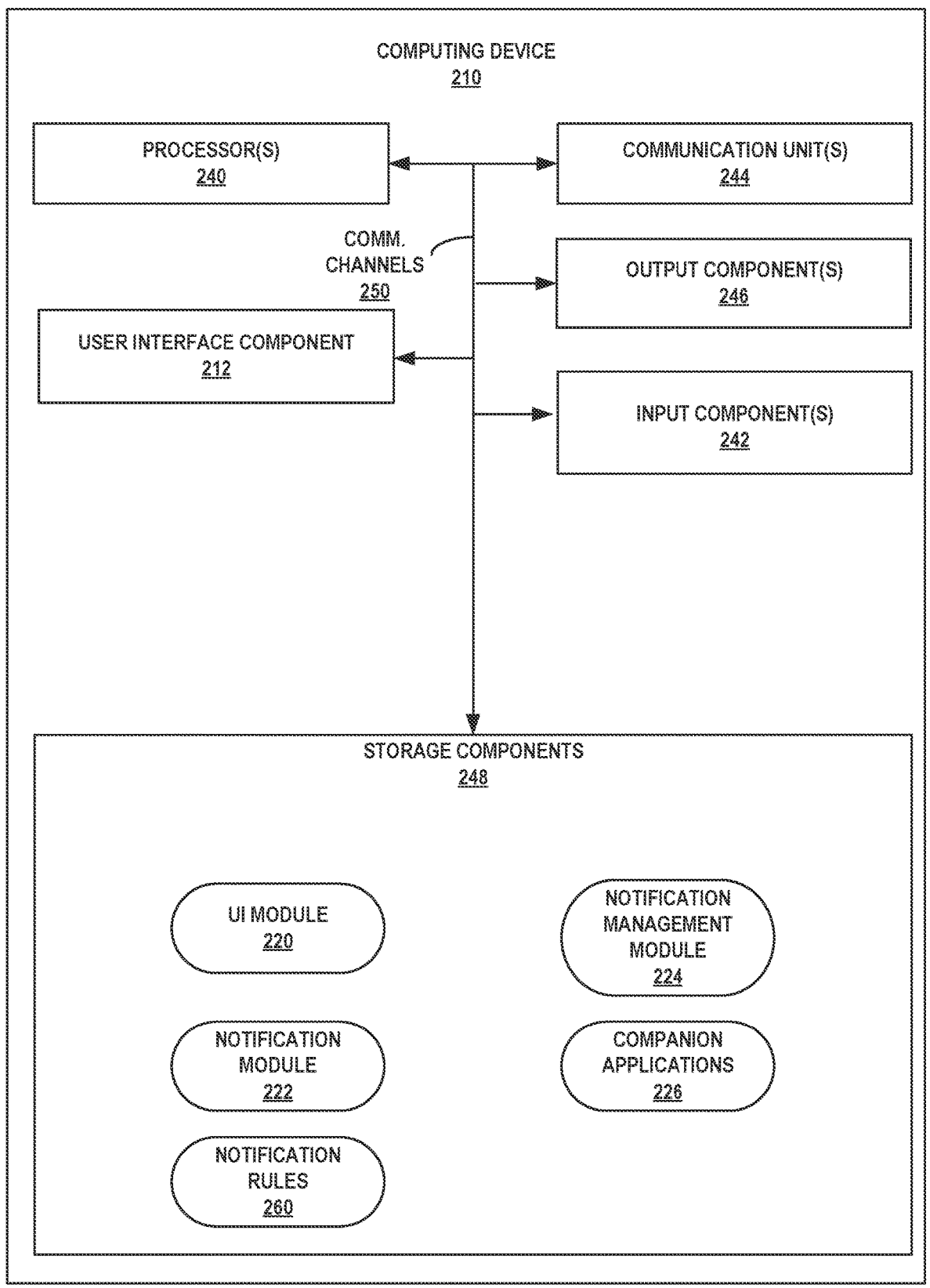
FIG. 2 is a block diagram illustrating further details of a computing device that performs notification management, in accordance with one or more aspects of the present disclosure.

FIG. 2 is a block diagram illustrating further details of a computing device 210 that performs notification management, in accordance with one or more aspects of the present disclosure. Computing device 210 of FIG. 2 is described below as an example of any of computing devices 110A-110N illustrated in FIGS. 1A and 1B.

As such, computing device 210 of FIG. 2 may be an example of a mobile phone, a tablet computer, a laptop computer, a desktop computer, a server, a mainframe, a set-top box, a television, a wearable device, a home automation device or system, a PDA, a gaming system, a media player, an e-book reader, a mobile television platform, an automobile navigation or infotainment system, or any other type of mobile, non-mobile, wearable, and non-wearable computing device configured to receive, and output an indication of notification data. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes UIC 212, one or more processors 240, one or more input components 242, one or more communication units 244, one or more output components 246, and one or more storage components 248. Storage components 248 of computing device 210 also include UI module 220, notification module 222, notification management module 224, and companion applications 226.

Communication channels 250 may interconnect each of the components 240, 212, 244, 246, 242, and 248 for inter-component communications (physically, communicatively, and/or operatively). In some examples, communication channels 250 may include a system bus, a network connection, an inter-process communication data structure, or any other method for communicating data.

One or more input components 242 of computing device 210 may receive input. Examples of input are tactile, audio, and video input. Input components 242 of computing device 210, in one example, includes a presence-sensitive display, touch-sensitive screen, mouse, keyboard, voice responsive system, video camera, microphone or any other type of device for detecting input from a human or machine.

One or more output components 246 of computing device 210 may generate output. Examples of output are tactile, audio, and video output. Output components 246 of computing device 210, in one example, includes a presence-sensitive display, sound card, video graphics adapter card, speaker, liquid crystal display (LCD), organic light-emitting diode (OLED) display, a light field display, haptic motors, linear actuating devices, or any other type of device for generating output to a human or machine.

One or more communication units 244 of computing device 210 may communicate with external devices via one or more wired and/or wireless networks by transmitting and/or receiving network signals on the one or more networks. Examples of one or more communication units 244 include a network interface card (e.g., an Ethernet card), an optical transceiver, a radio frequency transceiver, a GPS receiver, or any other type of device that can send and/or receive information. Other examples of one or more communication units 244 may include short wave radios, cellular data radios, wireless network radios, as well as universal serial bus (USB) controllers.

UIC 212 of computing device 200 may be hardware that functions as an input and/or output device for computing device 210. For example, UIC 212 may include a display component, which may be a screen at which information is displayed by UIC 212 and a presence-sensitive input component that may detect an object at and/or near the display component.

One or more processors 240 may implement functionality and/or execute instructions within computing device 210.

For example, one or more processors 240 on computing device 210 may receive and execute instructions stored by storage components 248 that execute the functionality of modules 220, 222, 224, and 226. The instructions executed by one or more processors 240 may cause computing device 210 to store information within storage components 248 during program execution. Examples of one or more processors 240 include application processors, display controllers, sensor hubs, and any other hardware configured to function as a processing unit. One or more processors 240 may execute instructions of modules 220, 222, 224, and 226 to cause UIC 212 to render portions of content of display data as one of user interface screen shots at UIC 212. That is, modules 220, 222, 224, and 226 may be operable by one or more processors 240 to perform various actions or functions of computing device 210.

One or more storage components 248 within computing device 210 may store information for processing during operation of computing device 210. That is, computing device 210 may store data, such as notification rules 260, accessed by modules 220, 222, 224, and 226 during execution at computing device 210. In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, and 226. UI module 220, notification module 222, notification management module 224, and companion applications 226 may execute at one or more processors 240 to perform functions similar to that of UI module 120, notification module 122, notification management module 124, and companion applications 126 of FIG. 1A.

One or more processors 240 is configured to execute notification module 222 to perform functions associated with receiving, managing, and otherwise handling at least a portion of the notification data generated and/or received by platforms, applications, and services executing at, or in communication with, computing device 210. Such notification data may be generated by applications and services executing at computing device 210 or received by computing device 210 from an external system.

Specifically, one or more processors 240 may execute notification module 222 to process notifications generated by an application executing at, or a service accessible to, computing device 210. As computing device 210 receives the notifications from any device, server, or service, executing at or in communication with computing device 210, notification module 222 may distribute portions of the notifications to other modules, applications, and/or services executing at or in communication with computing device 210.

One or more processors 240 is configured to execute notification management module 224 may handle the routing of notifications from computing device 210 to computing devices that are communicably coupled to computing device 210. Handling the routing of notifications from computing device 210 to the other computing devices includes selecting one or more computing devices that are to output indications of a notification, and determining the types of indications of a notification that the one or more computing devices are to output.

Notification management module 224 may be configured to, in response to notification module 222 receiving a notification generated by a notification source, execute at one or more processors 240 to route the notification from computing device 210 to one or more computing devices. In some examples, notification management module 224 may be configured to route a notification immediately upon the notification being received or generated by computing device 210. In other examples, notification management module 224 may be configured to refrain from routing a notification immediately upon the notification being received or generated by computing device 210. Instead, notification management module 224 may be configured to, upon computing device 210 receiving or generating a notification, wait for a period of time before routing the notification.

Notification management module 224 may be configured to, in response to notification module 222 receiving a notification generated by a notification source, execute at one or more processors 240 to route the notification to one or more computing devices that are each to output an indication of the notification. That is, by routing the notification to the one or more of computing devices, notification management module 224 selects the one or more computing devices that are each to output an indication of the notification.

Notification management module 224 may be configured to route notifications to one or more computing devices based on one or more notification routing rules 260. Each of the one or more notification routing rules 260 may specify, based on contextual information, whether a notification should be routed to one or more computing devices. In some examples, a notification routing rule may specify the types of notifications that are to be or are not to be routed to a computing device or a type of computing device. For example, one or more notification routing rules may specify that notifications of the conversation notification type are to be routed to computerized headphones and smart watches, but are not to be routed to smart home assistant devices. Notification management module 224 may be configured to, in response to notification module 222 receiving a notification generated by a notification source, execute at one or more processors 240 to determine the notification type of the notification and to determine, based on one or more routing rules 260, one or more computing types to which the notification of the determined notification type can be routed. Notification management module 224 may therefore be configured to determine the one or more of computing devices that are of the determined one or more computing types and to route the notification to the determined one or more of computing devices.

Notification management module 224 may be configured to associate each computing device with one or more notification routing rules 260 that specifies one or more notification types to be routed to the computing device and/or one or more notification types that are not to be routed to the computing device. In some examples, the one or more notification routing rules 260 may specify whether notifications of certain notification types are to be silenced and/or suppressed at computing device 210 when such notifications are routed to one or more other computing devices. A notification may be silenced at computing device 210 if computing device 210 outputs an indication of the notification for display but refrains from outputting an audible alert and/or haptic feedback indicative of the notification. A notification may be suppressed at computing device 210 if computing device 210 refrains from outputting any indication of the notification.

In some examples, the one or more notification routing rules 260 may include one or more conditional notification routing rules, and notification management module 224 may be configured to route notifications based at least in part on the one or more conditional notification routing rules. A conditional notification routing rule may specify that a notification is to be routed to a particular computing device if one or more conditions specified by the conditional notification routing rule is met.

In some examples, the one or more notification routing rules 260 may include one or more cross-device notification routing rules. Cross-device notification routing rules may specify, when a user uses different types of devices at the same time, the manner in which the different computing devices being used by the user may output notifications in conjunction with each other in order to take advantage of the different capabilities of the different types of devices. That is, the one or more cross-device notification routing rules may enable the same notification to be presented in different ways on different computing devices depending on the device capabilities of the computing devices being used by the user of computing device 210.

Notification management module 224 may be configured to route a notification to a selected computing device by causing the selected computing device to output an indication of the notification in a manner determined by notification management module 224. For example, notification management module 224 may route a notification to a selected computing device by sending, to the selected computing device, a request to output an indication of the notification and/or by sending an indication of the manner in which the selected computing device is to output the indication of the notification, such as an indication of whether the selected computing device is to audibly output an audible alert, whether the selected computing device is to output haptic feedback, whether the selected computing device is to output an indication of the notification for display at a display device of the selected computing device, and the like.

If companion applications 226 associated with computing devices external to computing device 210 are installed at computing device 210, notification management module 224 may be configured to communicate with companion applications 226 to route a notification to one or more computing devices communicably coupled to computing device 210. In some examples, companion applications 126 associated with one or more computing devices may receive indications of each notification received by notification module 222, and each of companion applications 226 may be configured to, for each notification received by notification module 222, communicate with notification management module 224 to determine, based on applying the one or more notification routing rules 260, whether an associated computing device is to output an indication of the notification.

In some examples, companion applications 226 may not receive indications of each notification received by notification module 222. Instead, notification management module 224 may be configured to communicate with companion applications 226 to route notifications to one or more computing devices. For example, if notification management module 224 determines to route a notification to a first computing device but not to a second computing device, notification management module 224 may be configured to send, to the companion application associated with the first computing device, a request to output an indication of the notification and an indication of the manner in which the first computing device is to output the indication of the notification. The companion application associated with the first computing device may therefore be configured to communicate with the first computing device to cause the first computing device to output the indication of the notification in the indicated manner.

In some examples, notification module 222 and/or notification management module 224 may also provide an API that companion applications 226 may use to listen for notifications received by notification module 222. Using the API to listen for notifications received by notification module 222 may enable companion applications 226 to implement and perform the functionalities of notification management module 224 described throughout this disclosure. For example, because each of companion applications 226 is associated with one or more computing devices, a companion application may be configured to use the notification listener API to listen for notifications of the one or more notification types supported by the one or more computing devices associated with the companion application. The companion application may be configured to, in response to determining that notification module 222 has received a notification of a notification type supported by the one or more computing devices associated with the companion application, route the notification to the one or more computing devices associated with the companion application.

Similarly, companion applications 226 may also be configured to use the notification listener API to implement conditional routing rules and cross-device routing rules. Companion applications 226 may be configured to exchange state information associated with computing devices associated with companion applications 226 and/or may send and receive state information associated with the computing devices to and from notification module 222 and/or notification management module 224. Companion applications 226 may be configured to use such state information associated with the computing devices to route notifications to the computing devices in accordance with conditional routing rules and/or cross-device routing rules.

In some examples, notification module 222 and/or notification management module 224 may be configured provide a user interface, such as a GUI, that is outputted at one or more output components 246 with which a user of computing device 210 may interact by providing user input at one or more input components 242 to select, specify, and/or customize the notification routing rules 260 that govern the routing of notifications to computing devices external to computing device 210. Such a user interface may provide a centralized view of the notification routing rules 260 so that a user of computing device 210 is able to view or otherwise determine the notification routing rules 260 that in effect and how such notification routing rules 260 affect the routing of notifications. The user interface may also enable the user to be able to customize and/or adjust the notification routing rules 260. For example, the user interface may provide one or more controls or other user interface elements that enable the user to turn off notifications for one or more computing devices, thereby causing the one or more of computing devices to refrain from outputting indications of notifications.

In some examples, notification module 222 and/or notification management module 224 may be configured to provide an API that can be accessed and/or invoked by applications at computing device 210 to select, specify, and/or customize the notification routing rules 260 that govern the routing of notifications to other computing devices. Companion applications 226 may be configured to use the API to create and/or modify one or more notification routing rules 260 associated with other computing devices. That is, a companion application associated with a computing device may be configured to use the API to create and/or modify one or more notification routing rules 260 associated with the associated computing device. For example, a companion application associated with a computing device may be configured to use the API to specify one or more routing rules 260 regarding the notification types that can be routed to the associated computing device, one or more routing rules 260 regarding whether to silence computing device 210 when a notification is routed to the associated computing device, the manner in which the associated computing device outputs indications of notifications of certain notification types, etc.

In some examples, companion applications 226 may be configured to use the API provide by notification module 222 and/or notification management module 224 to generate and output user interfaces (e.g., for display at one or more output components 246) with which the user of computing device 210 can interact via one or more input components 242 to create and/or modify notification routing rules 260 associated with other computing devices. Specifically, a companion application associated with a computing device (may output a user interface that provides a view of the notification settings and/or notification routing rules 260 for the associated computing device.

The user interface may enable a user to customize and/or adjust the notification routing rules 260 and/or the notification settings for the associated computing device. For example, the user interface may provide one or more controls or other user interface elements that enable the user to turn notifications on and off to control whether notifications are routed to the associated computing device, specify the notification types to be routed to the associated computing device, specify the application executing at the associated computing device that is to output the indications of notifications routed to the associated computing device, specify whether the associated computing device suppresses and/or silences other computing devices (e.g., computing device 210) to prevent other computing devices from outputting indications of notifications that are also routed to the associated computing devices, and the like.

In some examples, in addition or alternatively, notification module 222 and/or notification management module 224 may also be configured to provide a user interface, such as a GUI, that is outputted (e.g., for display at one or more output components 246) with which a user of computing device 210 may interact to select, specify, and/or customize the notification routing rules 260 that govern the routing of notifications to other computing devices. Such a user interface may provide a centralized view of the notification routing rules 260 so that a user of computing device 210 is able to view the notification routing rules 260 that in effect and how such notification routing rules 260 affect the routing of notifications for other computing devices. The user interface may also enable the user to customize and/or adjust the notification routing rules 260 and/or notification settings of other computing devices. For example, the user interface may provide one or more controls or other user interface elements that enable the user to turn notifications on and off to control whether notifications are routed to other computing devices, specify the notification types to be routed to other computing devices, specify the applications executing at one or more of other computing devices that is to output the indications of notifications routed to other computing devices, specify whether one or more of the other computing devices suppresses and/or silences other computing devices (e.g., computing device 210) to prevent other computing devices from outputting indications of notifications that are also routed to other computing devices, and the like.

Figure 3:
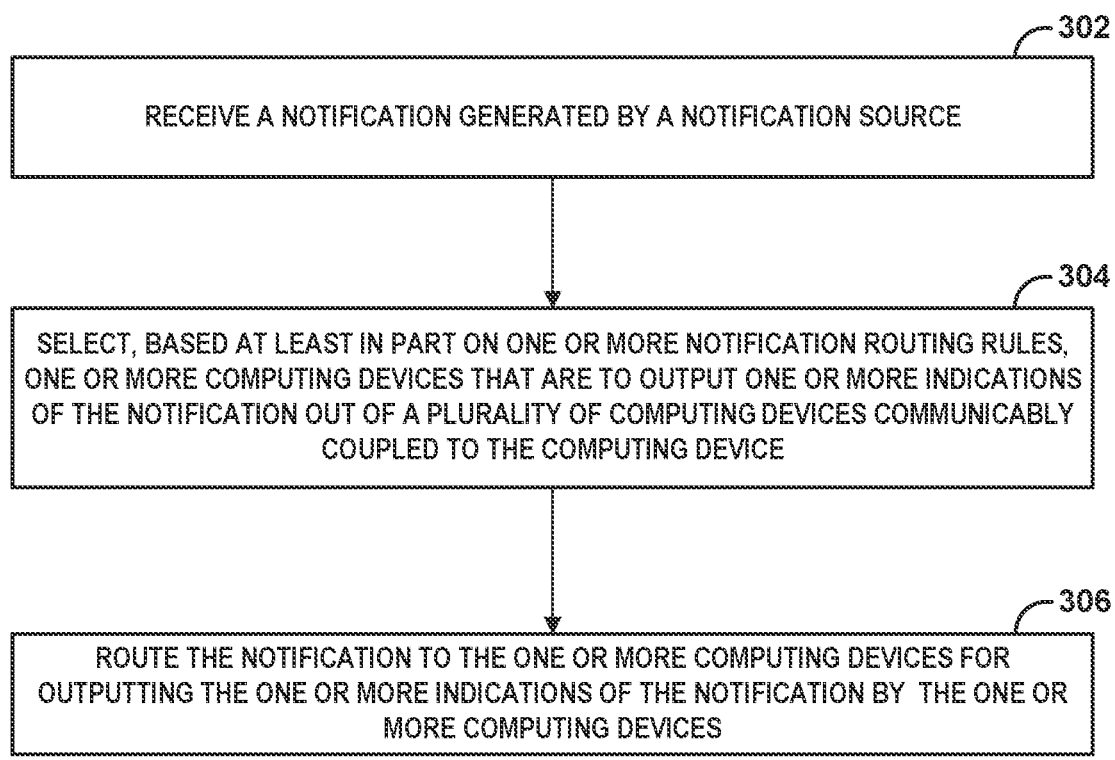
FIG. 3 is a flowchart illustrating example operations performed by an example computing device that is configured to perform notification management, in accordance with one or more aspects of the present disclosure.

FIG. 3 is a flowchart illustrating example operations performed by an example computing device that is configured to perform notification management, in accordance with one or more aspects of the present disclosure. FIG. 3 is described below in the context of computing device 210 of FIG. 2.

As shown in FIG. 3, one or more processors 240 of computing device 210 may receive a notification generated by a notification source (302). For example, notification module 222 may receive a notification from an application executing at computing device 210 or from an external system via a network. One or more processors 240 may select, based at least in part on one or more notification routing rules 260, one or more computing devices that are to output one or more indications of the notification out of a plurality of computing devices communicably coupled to the computing device 210 (304). One or more processors 240 may route the notification to the one or more computing devices for outputting the one or more indications of the notification by each of the one or more computing devices (306).

In some examples, to select the one or more computing devices that are to output the one or more indications of the notification out of the plurality of computing devices, the one or more processors 240 may select, based at least in part on the one or more notification routing rules 260, the one or more computing devices that are to output the one or more indications of the notification out of the plurality of computing devices based at least in part on a notification type of the notification.

In some examples, the one or more notification routing rules 260 specify one or more notification types that can be routed to the one or more computing devices, and to select the one or more computing devices that are to output the one or more indications of the notification out of the plurality of computing devices based at least in part on the notification type of the notification, the one or more processors may determine that the one or more notification types that can be routed to the one or more computing devices include the notification type of the notification and may, in response to determining that the one or more notification types that can be routed to the one or more computing devices include the notification type of the notification, select the one or more computing devices that are to output the one or more indications of the notification.

In some examples, the one or more notification routing rules 260 specify a second one or more notification types that can be routed to a second one or more computing devices, and to select the one or more computing devices that are to output the one or more indications of the notification out of the plurality of computing devices based at least in part on the notification type of the notification, the one or more processors 240 may determine that the second one or more notification types that can be routed to the second one or more computing devices do not include the notification type of the notification, and in response to determining that the second one or more notification types that can be routed to the second one or more computing devices do not include the notification type of the notification, refrain from including the second one or more computing devices in the one or more computing devices that are to output the one or more indications of the notification.

In some examples, the one or more notification routing rules 260 include one or more conditional notification routing rules that specify one or more conditions associated with a second computing device of the plurality of computing devices.

In some examples, to select the one or more computing devices that are to output the one or more indications of the notification out of the plurality of computing devices, the one or more processors 240 may determine that the one or more conditions specified by the one or more conditional notification routing rules is satisfied and may, in response to determining that the one or more conditions specified by the one or more conditional notification routing rules is satisfied, select the second computing device to output an indication of the notification out of the plurality of computing devices.

In some examples, the one or more conditional notification routing rules specify that the notification is to be routed to the second computing device if a user of the computing device 210 is physically closer to the second computing device than to the computing device 210, and wherein to select the one or more computing devices that are to output the one or more indication of the notification out of the plurality of computing devices, the one or more processors 240 may determine that the user of the computing device is physically closer to the second computing device than to the computing device 210. The one or more processors 240 may, in response to determining that the user of the computing device is physically closer to the second computing device than to the computing device 210: select the second computing device to output an indication of the notification out of the plurality of computing devices, and refrain from outputting the indication of the notification.

In some examples, to route the notification to the one or more computing devices for outputting the one or more indications of the notification by the one or more computing devices, the one or more processors 240 may cause a third computing device of the one or more computing devices to present an indication of the notification in a specified manner in response to the one or more computing devices including a fourth computing device.

In some examples, the notification is of a conversation notification type, the third computing device comprises computerized headphones, the fourth computing device is operably coupled to a display, and to cause the third computing device of the one or more computing devices to present the indication of the notification in the specified manner in response to the one or more computing devices including the fourth computing device, the one or more processors 240 may cause the third computing device to refrain from outputting an audio transcription of the contents of the notification in response to the notification also being routed to the fourth computing device that is operably coupled to the display.

In some examples, the one or more notification routing rules 260 includes a notification routing rule that silences the computing device 210 from outputting at least one of: an audible alert or haptic feedback associated with the notification in response to selecting a particular one of the plurality of computing devices to output an indication of the notification.

Aspects of this disclosure include the following examples.

Example 1: A method includes receiving, by one or more processors of a computing device, a notification generated by a notification source; selecting, by the one or more processors and based at least in part on one or more notification routing rules, one or more computing devices that are to output one or more indications of the notification out of a plurality of computing devices communicably coupled to the computing device; and routing, by the one or more processors, the notification to the one or more computing devices for outputting the one or more indications of the notification by the one or more computing devices.

Example 2: The method of example 1, wherein selecting the one or more computing devices that are to output the one or more indications of the notification out of the plurality of computing devices further comprises: selecting, by the one or more processors and based at least in part on the one or more notification routing rules, the one or more computing devices that are to output the one or more indications of the notification out of the plurality of computing devices based at least in part on a notification type of the notification.

Example 3: The method of example 2, wherein the one or more notification routing rules specify one or more notification types that can be routed to the one or more computing devices, and wherein selecting the one or more computing devices that are to output the one or more indications of the notification out of the plurality of computing devices based at least in part on the notification type of the notification further comprises: determining, by the one or more processors, that the one or more notification types that can be routed to the one or more computing devices include the notification type of the notification; and in response to determining that the one or more notification types that can be routed to the one or more computing devices include the notification type of the notification, selecting, by the one or more processors, the one or more computing devices that are to output the one or more indications of the notification.

Example 4: The method of example 3, wherein the one or more notification routing rules specify a second one or more notification types that can be routed to a second one or more computing devices, and wherein selecting the one or more computing devices that are to output the one or more indications of the notification out of the plurality of computing devices based at least in part on the notification type of the notification further comprises: determining, by the one or more processors, that the second one or more notification types that can be routed to the second one or more computing devices do not include the notification type of the notification; and in response to determining that the second one or more notification types that can be routed to the second one or more computing devices do not include the notification type of the notification, refraining, by the one or more processors, from including the second one or more computing devices in the one or more computing devices that are to output the one or more indications of the notification.

Example 5: The method of any of examples 1-4, wherein the one or more notification routing rules include one or more conditional notification routing rules that specify one or more conditions associated with a second computing device of the plurality of computing devices.

Example 6: The method of example S, wherein selecting the one or more computing devices that are to output the one or more indications of the notification out of the plurality of computing devices further comprises: determining, by the one or more processors, that the one or more conditions specified by the one or more conditional notification routing rules is satisfied; and in response to determining that the one or more conditions specified by the one or more conditional notification routing rules is satisfied, selecting, by the one or more processors, the second computing device to output an indication of the notification out of the plurality of computing devices.

Example 7: The method of any of examples 5 and 6, wherein the one or more conditional notification routing rules specify that the notification is to be routed to the second computing device if a user of the computing device is physically closer to the second computing device than to the computing device, and wherein selecting the one or more computing devices that are to output the one or more indications of the notification out of the plurality of computing devices further comprises: determining, by the one or more processors, that the user of the computing device is physically closer to the second computing device than to the computing device; and in response to determining that the user of the computing device is physically closer to the second computing device than to the computing device: selecting, by the one or more processors, the second computing device to output an indication of the notification out of the plurality of computing devices, and refraining, by the one or more processors, from outputting the indication of the notification.

Example 8: The method of any of examples 1-7, wherein routing the notification to the one or more computing devices for outputting the one or more indications of the notification by the one or more computing devices further comprises: causing, by the one or more processors, a third computing device of the one or more computing devices to present an indication of the notification in a specified manner in response to the one or more computing devices including a fourth computing device.

Example 9: The method of example 8, wherein the notification is of a conversation notification type, wherein the third computing device comprises computerized headphones, wherein the fourth computing device is operably coupled to a display, and wherein causing the third computing device of the one or more computing devices to present the indication of the notification in the specified manner in response to the one or more computing devices including the fourth computing device further comprises: causing, by the one or more processors, the third computing device to refrain from outputting an audio transcription of the contents of the notification in response to the notification also being routed to the fourth computing device that is operably coupled to the display.

Example 10: The method of any of examples 1-9, wherein the one or more notification routing rules includes a notification routing rule that silences the computing device from outputting at least one of: an audible alert or haptic feedback associated with the notification in response to selecting a particular one of the plurality of computing devices to output an indication of the notification.

Example 11: A computing device includes a memory; and one or more processors configured to: receive a notification generated by a notification source; select, based at least in part on one or more notification routing rules, one or more computing devices that are to output one or more indications of the notification out of a plurality of computing devices communicably coupled to the computing device; and route the notification to the one or more computing devices for outputting the one or more indications of the notification by each of the one or more computing devices.

Example 12: The computing device of example 11, wherein to select the one or more computing devices that are to output the one or more indications of the notification out of the plurality of computing devices, the one or more processors are further configured to: select, based at least in part on the one or more notification routing rules, the one or more computing devices that are to output the one or more indications of the notification out of the plurality of computing devices based at least in part on a notification type of the notification.

Example 13: The computing device of example 12, wherein the one or more notification routing rules specify one or more notification types that can be routed to the one or more computing devices, and wherein to select the one or more computing devices that are to output the one or more indications of the notification out of the plurality of computing devices based at least in part on the notification type of the notification, the one or more processors are further configured to: determine that the one or more notification types that can be routed to the one or more computing devices include the notification type of the notification; and in response to determining that the one or more notification types that can be routed to the one or more computing devices include the notification type of the notification, select the one or more computing devices that are to output the one or more indications of the notification.

Example 14: The computing device of example 13, wherein the one or more notification routing rules specify a second one or more notification types that can be routed to a second one or more computing devices, and wherein to select the one or more computing devices that are to output the one or more indications of the notification out of the plurality of computing devices based at least in part on the notification type of the notification, the one or more processors are further configured to: determine that the second one or more notification types that can be routed to the second one or more computing devices do not include the notification type of the notification; and in response to determining that the second one or more notification types that can be routed to the second one or more computing devices do not include the notification type of the notification, refrain from including the second one or more computing devices in the one or more computing devices that are to output the one or more indications of the notification.

Example 15: The computing device of any of examples 11-14, wherein the one or more notification routing rules include one or more conditional notification routing rules that specify one or more conditions associated with a second computing device of the plurality of computing devices.

Example 16: The computing device of example 15, wherein to select the one or more computing devices that are to output the one or more indications of the notification out of the plurality of computing devices, the one or more processors are further configured to: determine that the one or more conditions specified by the one or more conditional notification routing rules is satisfied; and in response to determining that the one or more conditions specified by the one or more conditional notification routing rules is satisfied, select the second computing device to output an indication of the notification out of the plurality of computing devices.

Example 17: The computing device of any of examples 15 and 16, wherein the one or more conditional notification routing rules specify that the notification is to be routed to the second computing device if a user of the computing device is physically closer to the second computing device than to the computing device, and wherein to select the one or more computing devices that are to output the one or more indications of the notification out of the plurality of computing devices, the one or more processors are further configured to: determine that the user of the computing device is physically closer to the second computing device than to the computing device; and in response to determining that the user of the computing device is physically closer to the second computing device than to the computing device: select the second computing device to output an indication of the notification out of the plurality of computing devices, and refrain from outputting the indication of the notification.

Example 18: The computing device of any of examples 11-17, wherein to route the notification to the one or more computing devices for outputting the one or more indications of the notification by the one or more computing devices, the one or more processors are further configured to: Cause a third computing device of the one or more computing devices to present an indication of the notification in a specified manner in response to the one or more computing devices including a fourth computing device.

Example 19: The computing device of example 18, wherein the notification is of a conversation notification type, wherein the third computing device comprises computerized headphones, wherein the fourth computing device is operably coupled to a display, and wherein to cause the third computing device of the one or more computing devices to present the indication of the notification in the specified manner in response to the one or more computing devices including the fourth computing device, the one or more processors are further configured to: cause the third computing device to refrain from outputting an audio transcription of the contents of the notification in response to the notification also being routed to the fourth computing device that is operably coupled to the display.

Example 20: A non-transitory computer-readable storage medium includes receive a notification generated by a notification source; select, based at least in part on one or more notification routing rules, one or more computing devices that are to output one or more indications of the notification out of a plurality of computing devices communicably coupled to the computing device; and route the notification to the one or more computing devices for outputting the one or more indications of the notification by each of the one or more computing devices.

Example 21: A method includes receiving, by a computing device, a notification generated by a notification source; selecting, by the computing device and based at least in part on one or more notification routing rules, one or more computing devices that are each to output an indication of the notification out of a plurality of computing devices communicably coupled to the computing device; and routing, by the computing device, the notification to the one or more computing devices for outputting by each of the one or more computing devices.

Example 22: The method of example 21, further includes selecting, by the computing device, a second one or more computing devices that are each to refrain from outputting any indications of the notification out of the plurality of computing devices; and refraining, by the computing device, from routing the notification to each of the second one or more computing devices.

Example 23: The method of any of examples 21 and 22, wherein selecting the one or more computing devices that are each to output the indication of the notification out of the plurality of computing devices further comprises: selecting, by the computing device, the one or more computing devices that are each to output the indication of the notification out of the plurality of computing devices based at least in part on a notification type of the notification.

Example 24: The method of example 23 wherein the notification type of the notification is one of: an on-going notification type; an alerting notification type; a silent notification type, or a conversation notification type.

Example 25: The method of any of examples 21-24, wherein the one or more notification routing rules include, for a second computing device of the plurality of computing devices, a notification routing rule that specify one or more notification types that are accepted by the second computing device.

Example 26: The method of example 25, wherein selecting the one or more computing devices that are each to output the indication of the notification out of the plurality of computing devices further comprises: determining, by the computing device and based at least in part on whether the notification type of the notification is in the one or more notification types that are accepted by the second computing device, whether to select the second computing device to output the indication of the notification.

Example 27: The method of any of examples 21-26, wherein the one or more notification routing rules include a conditional notification routing rule that specifies a condition associated with a second computing device of the plurality of computing devices.

Example 28: The method of example 27, wherein selecting the one or more computing devices that are each to output the indication of the notification out of the plurality of computing devices further comprises: determining, by the computing device and based at least in part on whether the second computing device meets the condition specified by the conditional notification routing rule, whether to select the second computing device to output the indication of the notification.

Example 29: The method of any of examples 27 and 28, wherein the second computing device is a smart watch, and wherein the condition associated with the second computing device specifies that the second computing device be worn and unlocked.

Example 30: The method of any of examples 21-29, wherein the one or more notification routing rules includes a rule that silences the computing device from outputting at least one of: an audible alert or haptic feedback associated with the notification in response to selecting a particular one of the plurality of computing devices to output the indication of the notification.

Example 31: The method of any of examples 21-30, wherein routing the notification to the one or more computing devices for outputting by each of the one or more computing devices further comprises: sending, by the computing device to each of the one or more computing devices, a request to output the indication of the notification.

Example 32: The method of any of examples 21-31, wherein routing the notification to the one or more computing devices for outputting by each of the one or more computing devices further comprises: sending, by the computing device to each of the one or more computing devices, an indication of a manner of outputting the indication of the notification.

Example 33: The method of any of examples 21-32, further includes providing, by the computing device, an application programming interface for modifying the one or more notification routing rules.

Example 34: A computing device includes a memory; and at least one processor configured to perform any one of the methods of claims 21-33.

Example 35: A computer-readable storage medium comprising instructions, that when executed, cause at least one processor of a computing device to perform any one of the methods of examples 21-33.

Example 36: A computer program product comprising instructions which, when the program is executed by at least one processor of a computing device, cause the computing device to carry out any one of the methods of examples 21-33.

Example 37: A system comprising means for performing any one of the methods of examples 21-33.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structures suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Various embodiments have been described. These and other embodiments are within the scope of the following claims.

What is claimed is:

1. A method comprising:
   receiving, by one or more processors of a computing device, a notification generated by a notification source;
   selecting, by the one or more processors and based at least in part on one or more notification routing rules, one or more computing devices that are to output one or more indications of the notification out of a plurality of computing devices communicably coupled to the computing device, wherein the one or more notification routing rules includes a notification routing rule that silences the computing device from outputting at least one of: an audible alert, a visual alert, or haptic feedback associated with the notification in response to selecting a particular one of the plurality of computing devices to output an indication of the notification; and
   routing, by the one or more processors, the notification to the one or more computing devices for outputting the one or more indications of the notification by the one or more computing devices.

2. The method of claim 1, wherein selecting the one or more computing devices that are to output the one or more indications of the notification out of the plurality of computing devices further comprises:
   selecting, by the one or more processors and based at least in part on the one or more notification routing rules, the one or more computing devices that are to output the one or more indications of the notification out of the plurality of computing devices based at least in part on a notification type of the notification.

3. The method of claim 2, wherein the one or more notification routing rules specify one or more notification types that can be routed to the one or more computing devices, and wherein selecting the one or more computing devices that are to output the one or more indications of the notification out of the plurality of computing devices based at least in part on the notification type of the notification further comprises:
   determining, by the one or more processors, that the one or more notification types that can be routed to the one or more computing devices include the notification type of the notification; and
   in response to determining that the one or more notification types that can be routed to the one or more computing devices include the notification type of the notification, selecting, by the one or more processors, the one or more computing devices that are to output the one or more indications of the notification.

4. The method of claim 3, wherein the one or more notification routing rules specify a second one or more notification types that can be routed to a second one or more computing devices, and wherein selecting the one or more computing devices that are to output the one or more indications of the notification out of the plurality of computing devices based at least in part on the notification type of the notification further comprises:
   determining, by the one or more processors, that the second one or more notification types that can be routed to the second one or more computing devices do not include the notification type of the notification; and in response to determining that the second one or more notification types that can be routed to the second one or more computing devices do not include the notification type of the notification, refraining, by the one or more processors, from including the second one or more computing devices in the one or more computing devices that are to output the one or more indications of the notification.

5. The method of claim 1, wherein the one or more notification routing rules include one or more conditional notification routing rules that specify one or more conditions associated with a second computing device of the plurality of computing devices.

6. The method of claim 5, wherein selecting the one or more computing devices that are to output the one or more indications of the notification out of the plurality of computing devices further comprises:

determining, by the one or more processors, that the one or more conditions specified by the one or more conditional notification routing rules is satisfied; and in response to determining that the one or more conditions specified by the one or more conditional notification routing rules is satisfied, selecting, by the one or more processors, the second computing device to output an indication of the notification out of the plurality of computing devices.

7. The method of claim 5, wherein the one or more conditional notification routing rules specify that the notification is to be routed to the second computing device if a user of the computing device is physically closer to the second computing device than to the computing device, and wherein selecting the one or more computing devices that are to output the one or more indications of the notification out of the plurality of computing devices further comprises:

determining, by the one or more processors, that the user of the computing device is physically closer to the second computing device than to the computing device; and in response to determining that the user of the computing device is physically closer to the second computing device than to the computing device:

selecting, by the one or more processors, the second computing device to output an indication of the notification out of the plurality of computing devices, and refraining, by the one or more processors, from outputting the indication of the notification.

8. The method of claim 1, wherein routing the notification to the one or more computing devices for outputting the one or more indications of the notification by the one or more computing devices further comprises:

causing, by the one or more processors, a third computing device of the one or more computing devices to present an indication of the notification in a specified manner in response to the one or more computing devices including a fourth computing device.

9. The method of claim 8, wherein the notification is of a conversation notification type, wherein the third computing device comprises computerized headphones, wherein the fourth computing device is operably coupled to a display, and wherein causing the third computing device of the one or more computing devices to present the indication of the notification in the specified manner in response to the one or more computing devices including the fourth computing device further comprises:

causing, by the one or more processors, the third computing device to refrain from outputting an audio transcription of contents of the notification in response to the notification also being routed to the fourth computing device that is operably coupled to the display.

10. A computing device comprising:

a memory; and one or more processors configured to:

receive a notification generated by a notification source;

select, based at least in part on one or more notification routing rules, one or more computing devices that are to output one or more indications of the notification out of a plurality of computing devices communicably coupled to the computing device, wherein the one or more notification routing rules includes a notification routing rule that silences the computing device from outputting at least one of: an audible alert, a visual alert, or haptic feedback associated with the notification in response to selecting a particular one of the plurality of computing devices to output an indication of the notification; and route the notification to the one or more computing devices for outputting the one or more indications of the notification by each of the one or more computing devices.

11. The computing device of claim 10, wherein to select the one or more computing devices that are to output the one or more indications of the notification out of the plurality of computing devices, the one or more processors are further configured to:

select, based at least in part on the one or more notification routing rules, the one or more computing devices that are to output the one or more indications of the notification out of the plurality of computing devices based at least in part on a notification type of the notification.

12. The computing device of claim 11, wherein the one or more notification routing rules specify one or more notification types that can be routed to the one or more computing devices, and wherein to select the one or more computing devices that are to output the one or more indications of the notification out of the plurality of computing devices based at least in part on the notification type of the notification, the one or more processors are further configured to:

determine that the one or more notification types that can be routed to the one or more computing devices include the notification type of the notification; and in response to determining that the one or more notification types that can be routed to the one or more computing devices include the notification type of the notification, select the one or more computing devices that are to output the one or more indications of the notification.

13. The computing device of claim 12, wherein the one or more notification routing rules specify a second one or more notification types that can be routed to a second one or more computing devices, and wherein to select the one or more computing devices that are to output the one or more indications of the notification out of the plurality of computing devices based at least in part on the notification type of the notification, the one or more processors are further configured to:

determine that the second one or more notification types that can be routed to the second one or more computing devices do not include the notification type of the notification; and in response to determining that the second one or more notification types that can be routed to the second one or more computing devices do not include the notification type of the notification, refrain from including the second one or more computing devices in the one or more computing devices that are to output the one or more indications of the notification.

14. The computing device of claim 10, wherein the one or more notification routing rules include one or more conditional notification routing rules that specify one or more conditions associated with a second computing device of the plurality of computing devices.

15. The computing device of claim 14, wherein to select the one or more computing devices that are to output the one or more indications of the notification out of the plurality of computing devices, the one or more processors are further configured to:
   determine that the one or more conditions specified by the one or more conditional notification routing rules is satisfied; and
   in response to determining that the one or more conditions specified by the one or more conditional notification routing rules is satisfied, select the second computing device to output an indication of the notification out of the plurality of computing devices.

16. The computing device of claim 14, wherein the one or more conditional notification routing rules specify that the notification is to be routed to the second computing device if a user of the computing device is physically closer to the second computing device than to the computing device, and wherein to select the one or more computing devices that are to output the one or more indications of the notification out of the plurality of computing devices, the one or more processors are further configured to:
   determine that the user of the computing device is physically closer to the second computing device than to the computing device; and
   in response to determining that the user of the computing device is physically closer to the second computing device than to the computing device:
      select the second computing device to output an indication of the notification out of the plurality of computing devices, and
      refrain from outputting the indication of the notification.

17. The computing device of claim 10, wherein to route the notification to the one or more computing devices for outputting the one or more indications of the notification by the one or more computing devices, the one or more processors are further configured to:
   cause a third computing device of the one or more computing devices to present an indication of the notification in a specified manner in response to the one or more computing devices including a fourth computing device.

18. The computing device of claim 17, wherein the notification is of a conversation notification type, wherein the third computing device comprises computerized headphones, wherein the fourth computing device is operably coupled to a display, and wherein to cause the third computing device of the one or more computing devices to present the indication of the notification in the specified manner in response to the one or more computing devices including the fourth computing device, the one or more processors are further configured to:
   cause the third computing device to refrain from outputting an audio transcription of contents of the notification in response to the notification also being routed to the fourth computing device that is operably coupled to the display.

19. A non-transitory computer-readable storage medium comprising instructions, that when executed by one or more processors of a computing device, cause the one or more processors to:
   receive a notification generated by a notification source;
   select, based at least in part on one or more notification routing rules, one or more computing devices that are to output one or more indications of the notification out of a plurality of computing devices communicably coupled to the computing device, wherein the one or more notification routing rules includes a notification routing rule that silences the computing device from outputting at least one of: an audible alert, a visual alert, or haptic feedback associated with the notification in response to selecting a particular one of the plurality of computing devices to output an indication of the notification; and
   route the notification to the one or more computing devices for outputting the one or more indications of the notification by each of the one or more computing devices.

* * * * *